US011411233B2

(12) United States Patent
Sudhan Shanmugam et al.

(10) Patent No.: US 11,411,233 B2
(45) Date of Patent: Aug. 9, 2022

(54) FUEL CELL SYSTEMS AND METHODS FOR DETECTING FUEL CONTAMINANTS AND HYDROCARBON CONTENT

(71) Applicant: BLOOM ENERGY CORPORATION, Sunnyvale, CA (US)

(72) Inventors: Karthick Sudhan Shanmugam, Mumbai (IN); Abhishek Dudhmande, Mumbai (IN); Amit Nawathe, Mumbai (IN); Padiadpu Shankara Anantha, Mumbai (IN); Vijay Radhakrishnan, Mumbai (IN)

(73) Assignee: BLOOM ENERGY CORPORATION, San Jose, CA (US)

( * ) Notice: Subject to any disclaimer, the term of this patent is extended or adjusted under 35 U.S.C. 154(b) by 677 days.

(21) Appl. No.: 16/213,480

(22) Filed: Dec. 7, 2018

(65) Prior Publication Data

US 2020/0185741 A1    Jun. 11, 2020

(51) Int. Cl.
| | |
|---|---|
| *H01M 8/04* | (2016.01) |
| *H01M 8/04664* | (2016.01) |
| *H01M 8/0662* | (2016.01) |
| *H01M 8/04537* | (2016.01) |
| *H01M 8/04858* | (2016.01) |
| *H01M 8/04791* | (2016.01) |
| *H01M 8/04746* | (2016.01) |

(52) U.S. Cl.
CPC ..... *H01M 8/04679* (2013.01); *H01M 8/0491* (2013.01); *H01M 8/04552* (2013.01); *H01M 8/04649* (2013.01); *H01M 8/04753* (2013.01); *H01M 8/04798* (2013.01); *H01M 8/0675* (2013.01)

(58) Field of Classification Search
CPC ......... H01M 8/04679; H01M 8/04552; H01M 8/04649; H01M 8/04753; H01M 8/0675; H01M 8/0491; H01M 8/04798
See application file for complete search history.

(56) References Cited

U.S. PATENT DOCUMENTS

| | | | |
|---|---|---|---|
| 6,555,989 B1 * | 4/2003 | Pearson | H01M 8/04597 320/101 |
| 6,673,480 B1 * | 1/2004 | Wilkinson | H01M 8/0432 429/430 |
| 7,713,649 B2 | 5/2010 | Hickey et al. | |
| 8,617,763 B2 | 12/2013 | Armstrong et al. | |
| 8,652,697 B2 | 2/2014 | Gottmann et al. | |
| 9,461,319 B2 | 10/2016 | Sudhan et al. | |
| 9,461,320 B2 | 10/2016 | Ballantine et al. | |
| 9,859,580 B2 | 1/2018 | Ballantine et al. | |

(Continued)

OTHER PUBLICATIONS

U.S. Appl. No. 15/803,461, filed Nov. 3, 2017, Bloom Energy Corp.

*Primary Examiner* — Olatunji A Godo
(74) *Attorney, Agent, or Firm* — The Marbury Law Group PLLC (57) ABSTRACT

A fuel cell system and method, the system including power generating fuel cells disposed in a stack, each power generating fuel cell including an anode, a cathode, and an electrolyte, a sensing fuel cell including an anode, a cathode, and an electrolyte, and a fuel processor configured to purify a fuel provided to the power generating fuel cells and the sensing fuel cell. The anode of the sensing fuel cell is thinner than the anodes of the power generating fuel cells.

19 Claims, 5 Drawing Sheets

(56) References Cited

U.S. PATENT DOCUMENTS

| | | | |
|---|---|---|---|
| 2004/0197621 A1* | 10/2004 | Balliet | H01M 8/04462 |
| | | | 429/427 |
| 2015/0037699 A1* | 2/2015 | Lundblad | H01M 8/0494 |
| | | | 429/432 |
| 2017/0077535 A1 | 3/2017 | Sudhan S et al. | |
| 2017/0098842 A1 | 4/2017 | Trevisan et al. | |
| 2017/0331133 A1 | 11/2017 | Trevisan et al. | |
| 2017/0338502 A1* | 11/2017 | Pmsvvsv | H01M 8/04365 |

* cited by examiner

FUEL CELL SYSTEMS AND METHODS FOR DETECTING FUEL CONTAMINANTS AND HYDROCARBON CONTENT

FIELD

Aspects of the present invention relate to fuel cell systems and methods for detecting fuel contaminants and hydrocarbon content.

BACKGROUND

The reliability of fuel cell systems, such as a solid oxide fuel cell (SOFC) system, depends on the presence and concentration of undesirable constituents in the fuel stream and/or a hydrocarbon content of the fuel stream. Undesirable constituents, such as moisture, oxygen, siloxanes, and sulfur (including sulfur compounds), may degrade the fuel cell stack's performance and cause irreversible damage resulting in decreased efficiencies and costly replacement. Specifically, when using natural gas as a fuel, fuel cell systems may require desulfurization. Passing fuel through desulfurizer sorbent beds is one way to remove sulfur and sulfur compounds from fuel prior to use in a fuel cell.

However, the sorbent beds (e.g., absorbent and/or adsorbent beds) have a finite life and once the sorbent bed is exhausted, a breakthrough event may occur where contaminants such as sulfur species may pass through the sorbent bed without being adsorbed and reach the fuel cell stack, which may cause permanent damage and/or a reduction in fuel cell performance.

In addition, the hydrocarbon content of fuels provided to a fuel cell system may vary, which may result in performance reduction and/or system damage.

SUMMARY

Exemplary embodiments of the present disclosure provide a fuel cell system comprising: power generating fuel cells disposed in a stack, each power generating fuel cell comprising an anode, a cathode, and an electrolyte; a sensing fuel cell comprising an anode, a cathode, and an electrolyte; and a fuel processor configured to purify a fuel provided to the power generating fuel cells and the sensing fuel cell, wherein the anode of the sensing fuel cell is thinner than the anodes of the power generating fuel cells.

Exemplary embodiments of the present disclosure provide a fuel cell system comprising: fuel cells disposed in a stack; a power analyzer or DC/DC converter configured inject a testing waveform into the stack and to measure a resulting impedance response in at least one of the fuel cells; and a system controller configured to estimate the hydrocarbon content of a fuel provided to the stack, based on the measured impedance response.

Exemplary embodiments of the present disclosure provide a method of operating a fuel cell system comprising a stack of fuel cells, the method comprising: operating the stack of fuel cells using a fuel provided to the stack; injecting a waveform into the stack; measuring an impedance response in at least one of the fuel cells resulting from the waveform; and estimating a hydrocarbon content of the fuel based on the measured impedance response.

Exemplary embodiments of the present disclosure provide a method of operating a fuel cell system comprising a stack of power generating fuel cells and a sensing fuel cell having a thinner anode than anodes of the power generating fuel cells, the method comprising: providing a fuel to both the power generating fuel cells and the sensing fuel cell; and detecting sulfur poisoning of the sensing fuel cell based on an output of the sensing fuel cell.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention. It will also be understood that the term "about" may refer to a minor measurement errors of, for example, 5 to 10%.

Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

The term "fuel cell stack," as used herein, means a plurality of stacked fuel cells that can optionally share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, the stacks may share the same end plates. In this case, the stacks jointly comprise a distinct electrical entity, such as a column. In this case, the electrical power output from both stacks cannot be separately controlled.

Fuel cell systems, such as SOFC systems can be configured to operate most efficiently using natural gas as a fuel, such as natural gas provided from a natural gas pipeline. However, natural gas and other fuel sources may include contaminants, such as sulfur species. For example, natural gas may be contaminated with sulfur species such as, hydrogen sulfide ($H_2S$), t-butyl mercaptan ($C_4H_{10}S$), tetrahydrothiophene ($C_4H_8S$), or the like. Generally, prior to being supplied to a fuel cell stack, fuel is filtered through one or more sorbent beds to prevent such contaminants, such as sulfur species, from poisoning fuel cell catalysts. Herein, sulfur species may be addressed as specific contaminants, since sulfur poisoning is a primary source of fuel cell degradation. However, the present disclosure is not limited thereto.

In cases where a breakthrough event occurs, sulfur species may reach the fuel cells and may be adsorbed onto (e.g., poison) anodes of the fuel cells. In particular, it is believed that the sulfur species are adsorbed onto the nickel of the anodes and restrict fuel cell reactions by limiting reformation and proton generation. As a result, the performance of the fuel cell system may be reduced.

In particular, sulfur poisoning may occur in first and second stages. In the first stage, a fuel cell may exhibit a slow and steady voltage drop as sulfur species are adsorbed onto the anode thereof. If sulfur species exposure continues over a prolonged period, the fuel cell may enter the second stage, wherein a cell voltage of the fuel cell exhibits flickering (e.g., periodic voltage reductions). The first stage may be reversible if sulfur species are removed before a cell enters the second stage. However, the second stage may result in irreversible damage to the fuel cell.

Figure 1:
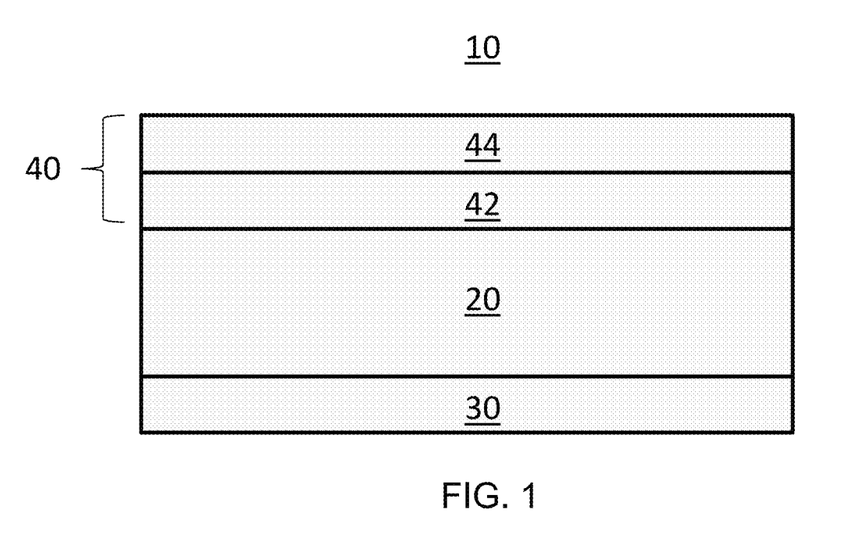
FIG. 1 is a perspective view of a fuel cell according to various embodiments of the present disclosure.

FIG. 1 illustrates an exemplary fuel cell 10, according to various embodiments of the present disclosure. Referring to FIG. 1, the fuel cell 10 may be a solid oxide fuel cell (SOFC). However, other fuel cell types, such as PEM, molten carbonate, phosphoric acid, etc. may also be used. The fuel cell 10 includes an electrolyte 20 disposed between a cathode 30 (e.g., first electrode) and an anode 40 (e.g. second electrode). As discussed in detail below, the fuel cell 10 may be referred to as a sensing fuel cell 11, when configured to detect sulfur poisoning.

The electrolyte 20 may comprise an ionically conductive ceramic, such as doped zirconia, doped ceria, and/or any other suitable ionically conductive ceramic oxide material. For example, the electrolyte 20 may include yttria-stabilized zirconia (YSZ), scandia-stabilized zirconia (SSZ), ytterbia-ceria-scandia-stabilized zirconia (YCSSZ), or blends thereof. In the YCSSZ, scandia may be present in an amount equal to 9 to 11 mol %, such as 10 mol %, ceria may present in amount greater than 0 (e.g., at least 0.5 mol %) and equal to or less than 2.5 mol %, such as 1 mol %, and ytterbia may be present in an amount greater than 0 and equal to or less than 2.5 mol %, such as 1 mol %, as disclosed in U.S. Pat. No. 8,580,456, which is incorporated herein, by reference. In other embodiments, the electrolyte may include samaria, gadolinia, or yttria-doped ceria.

The cathode 30 may include an electrically conductive material, such as an electrically conductive perovskite material, such as lanthanum strontium manganite (LSM). Other conductive perovskites, such as lanthanum strontium cobaltite ($(La,Sr)CoO_3$ "LSCo"), lanthanum strontium cobalt ferrite $(La,Sr)(Co,Fe)O_3$, etc., or metals, such as Pt, may also be used.

Furthermore, if desired, additional contact or current collector layers may be placed over the cathode 30 and anode 40, while additional interfacial layers, such as doped ceria interfacial layers, may be located between the electrodes 30, 40 and the electrolyte. For example, a Ni or nickel oxide anode contact layer and an LSM or LSCo cathode contact layer may be formed on the anode 40 and cathode 30 electrodes, respectively.

The anode 40 may comprise at least one cermet that includes a metallic phase and a ceramic phase. The metallic phase may include a metal catalyst and the ceramic phase may include one or more ceramic materials. The metallic phase may be very finely dispersed within the ceramic matrix of the ceramic phase, so as to limit damage that may occur if the metallic phase is oxidized. For example, the metallic phase may have an average grain size less than 500 nanometers, such as from about 100 to about 400 nanometers.

The ceramic phase of the anode 40 may comprise any suitable ionically conductive ceramic material, such as a doped ceria and/or a doped zirconia. For example, the ceramic phase may include, but is not limited to gadolinia-doped ceria (GDC), samaria-doped ceria (SDC), ytterbia-doped ceria (YDC), scandia-stabilized zirconia (SSZ), ytterbia-ceria-scandia-stabilized zirconia (YCSSZ), yttria stabilized zirconia (YSZ), or the like.

The metallic phase may include a metal catalyst such as nickel (Ni), which operates as an electron conductor. The metal catalyst may be in a metallic state or may be in an oxide state. For example, the metal catalyst forms a metal oxide when it is in an oxidized state. Thus, the anode 40 may be annealed in a reducing atmosphere prior to and/or during operation of the fuel cell 10, to reduce the metal catalyst to a metallic state.

According to some embodiments, the metallic phase in its oxide state may include the metal catalyst and a dopant (i.e., alloying element). For example, the metallic phase may be represented by Formula 1: $D_xNi_{1-x}O$. In Formula 1, D is a dopant (in any oxidation state) selected from Al, Ba, Ca, Cr, Fe, Mo, Re, Rh, Ru, Sr, and/or W or any combination thereof. Preferably, the dopant has a higher melting point than nickel. X may range from about 0.01 to about 0.1. In other embodiments, x may range from about 0.01 to about 0.04. For example, x may be about 0.02 and 1-x may be about 0.98.

Accordingly, the metallic phase in its metallic state may comprise from about 1 to about 10 atomic % (at. %) of the metal dopant and about 99 to about 90 at. % of the metal catalyst (e.g., Ni). For example, the metallic phase may comprise from about 2 to about 4 at. % of the metal dopant and about 98 to about 96 at. % of the metal catalyst.

The anode 40 may be an oxidation-tolerant electrode having a functionally graded configuration. For example, as shown in FIG. 1, the anode 40 may include a first layer 42 disposed on the electrolyte 20, and a second layer 44 disposed on the first layer 42. The first layer 42 may be disposed closer to the electrolyte 20 than the second layer 44. The first layer 42 may be configured to electrochemically oxidize a fuel. The second layer 44 may be configured to increase electron conduction and may operate as a reforming catalyst. The second layer 44 may have a higher porosity and/or higher Ni content, than the first layer 42.

The first and second layers 42, 44 may each include a cermet including a metallic phase and a ceramic phase, as described above. The metallic phases and/or the ceramic phases of the first and second layers 42, 44 may include the same or different materials. In some embodiments, one or both of the first and second layers 42, 44 may include only a single phase. For example, the second layer 44 may include a metallic phase and the ceramic phase may be omitted. A dopant may be added to one or both of the first and second layers 42, 44. For example, a dopant added to the second layer 44 may diffuse into the first layer 42 during a subsequent thermal treatment step.

In some embodiments, the first layer 42 may include, by weight percent, more of the ceramic phase and less of the metallic phase than the second layer 44. A weight percent ratio of the ceramic phase to the metallic phase included in the first layer 42 may range from about 99:1 to about 50:50. For example, the first layer 42 may include from about 70 to about 90 wt. % of the ceramic phase, and from about 10 to about 30 wt. % of the metallic phase, based on the total weight of the first layer 42. In some embodiments, the first layer 42 may include about 80 wt. % of the ceramic phase and about 20 wt. % of the metallic phase.

A weight percent ratio of the ceramic phase to the metallic phase in the second layer 44 may range from about 0:100 to about 50:50. For example, the second layer 44 may include from about 15 to about 35 wt. % of the ceramic phase, and from about 65 to about 85 wt. % of the metallic phase, based on the total weight of the second layer 44. In some embodiments, the second layer 44 may include about 20 wt. % of the ceramic phase and about 80 wt. % of the metallic phase. Alternatively, the second layer 44 may include from about 90 to 100 wt. % of the metallic phase. In other embodiments, when the second layer 44 includes a metallic phase comprising a metal catalyst doped with the dopant, the metallic phase may make up all or substantially all (e.g., greater than 98 wt. %) of the second layer 44.

The fuel cell 10 may be manufactured by forming the cathode 30 on a first side of the electrolyte 20, and forming the anode 40 on a second side of the electrolyte 20, by depositing corresponding inks using a method such as screen printing, inkjet printing, or the like, as disclosed in U.S. Pat. No. 8,617,763, which is incorporated herein by reference. The deposited inks may be dried and/or sintered.

Fuel Cell Systems

Figure 2:
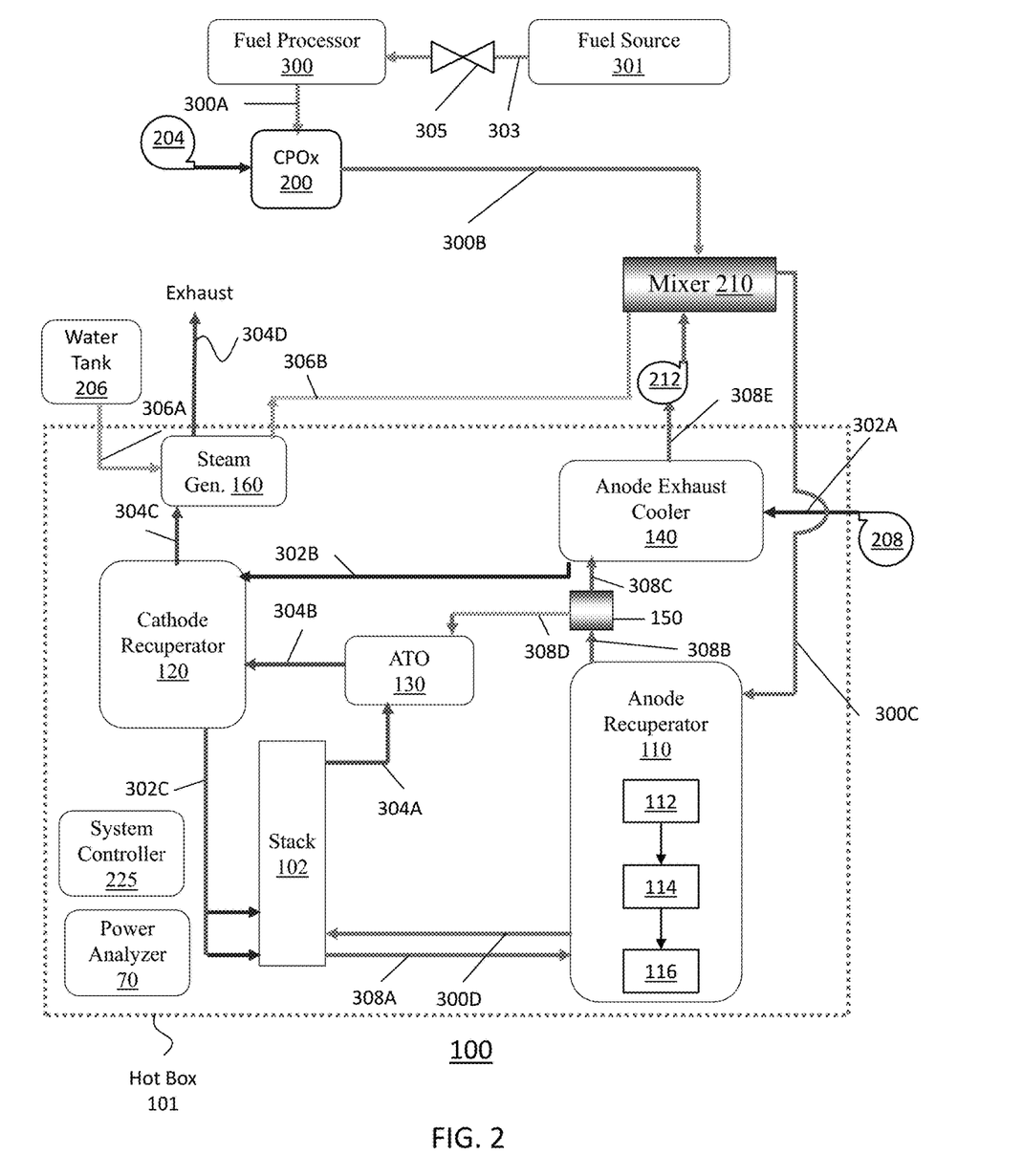
FIG. 2 is a schematic view of a SOFC system 100, according to various embodiments of the present disclosure.
Figure 3:
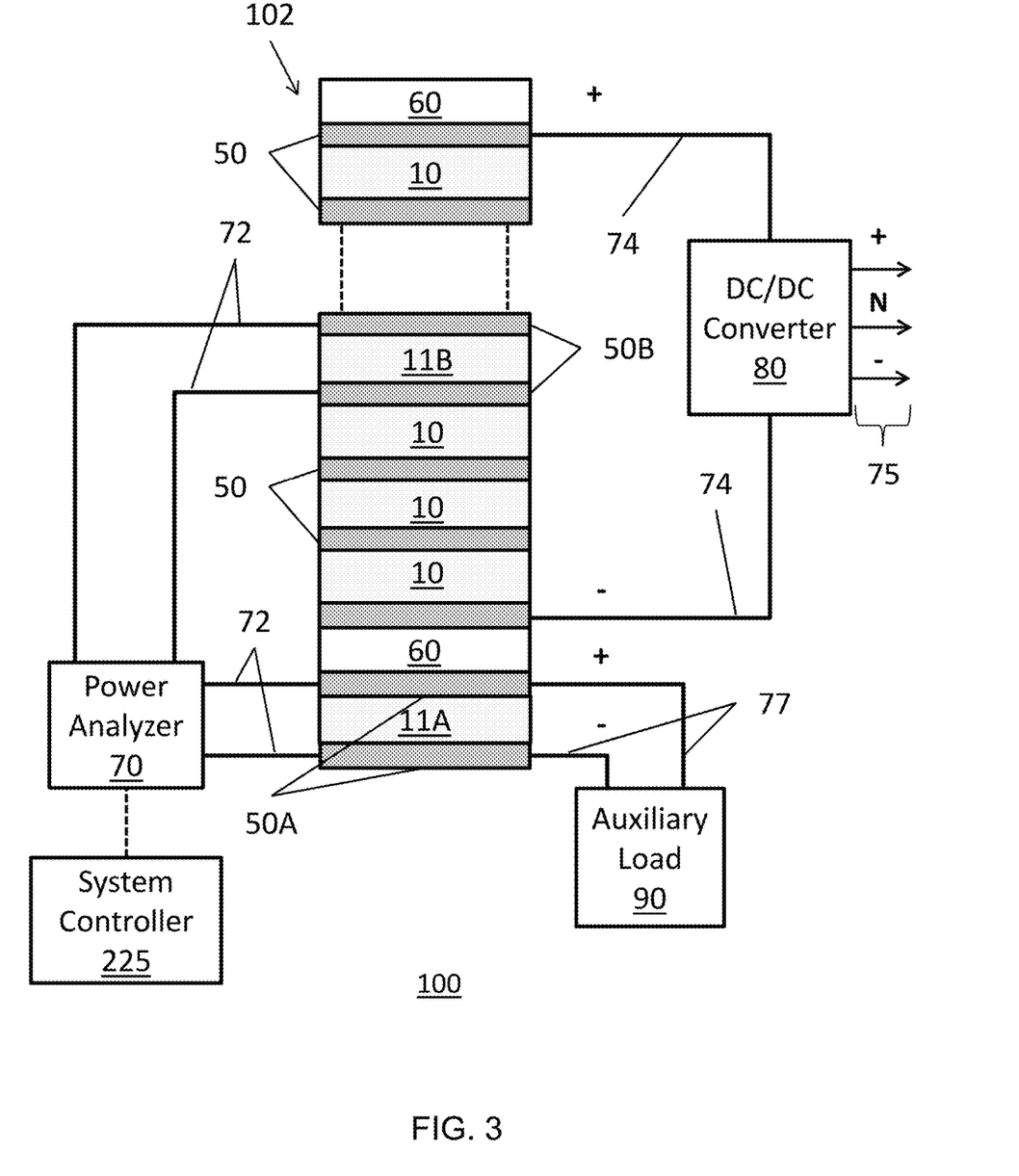
FIG. 3 is a plan view showing electrical connections and sulfur detection components that may be included in the system 100 of FIG. 2.

FIG. 2 is a schematic view of a fuel cell system 100, according to various embodiments of the present disclosure. Referring to FIG. 2, the system may include a hotbox 101 and various components disposed therein or adjacent thereto. The hot box 101 may contain one or more fuel cell stacks 102. The stacks 102 may include stacked fuel cells, such as power generating fuel cells 10 of FIG. 1, which are separated from one another by conductive interconnect plates 50 (see FIGS. 3A and 3B). The stacks 102 may be arranged over each other in a plurality of columns. A fuel cell column may include fuel manifolds disposed between adjacent stacks 102.

The fuel cell stacks 102 may be externally and/or internally manifolded. For example, the stacks 102 may be internally manifolded for fuel and air, with fuel and air risers extending through openings in the fuel cell layers and/or in the interconnect plates between the fuel cells. Alternatively, the fuel cell stacks 102 may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

The hot box 101 may also contain an anode recuperator heat exchanger 110, a cathode recuperator heat exchanger 120, an anode tail gas oxidizer (ATO) 130, an anode exhaust cooler 140, a splitter 150, and a steam generator 160. The system 100 may also include a catalytic partial oxidation (CPOx) reactor 200, a mixer 210, a CPOx blower 204, a main air blower 208, an anode recycle blower 212, and a fuel processor 300, which may be disposed outside of the hot box 101. However, the present disclosure is not limited to any particular location for each of the components with respect to the hot box 101.

The CPOx reactor 200 receives a fuel inlet stream from a fuel processor 300, through fuel conduit 300A. The CPOx blower 204 may provide air to the CPOx reactor 202. During a cold startup the fuel is partially oxidized in the CPOx reactor 200 by injection of air from the CPOx blower 204. The CPOx reactor 200 may include a glow plug to initiate this catalytic reaction. During this cold-start operational mode the CPOx reactor 200 may be operated at a temperature ranging from about 600° C. to about 800° C., such as from about 650° C. to about 750° C., or about 700° C. The CPOx blower 204 generally operates during startup, and is usually not operated during steady-state system operation.

The main air blower 208 may be configured to provide an air stream to the anode exhaust cooler 140 through air conduit 302A. Air flows from the anode exhaust cooler 140 to the cathode recuperator 120 through air conduit 302B. The air flows from the cathode recuperator 120 to the stack through air conduit 302C.

Anode exhaust generated in the stack 102 is provided to the anode recuperator 110 through anode exhaust conduit 308A. The anode exhaust may contain unreacted fuel. As such, the anode exhaust may also be referred to herein as fuel exhaust. The anode exhaust is provided from the anode recuperator 110 to a splitter 150 by anode exhaust conduit 308B. Anode exhaust may be provided from the splitter 150 to the anode exhaust cooler 140 by anode exhaust conduit 308C. Anode exhaust may be provided from the splitter 150 to the ATO 130 by anode exhaust conduit 308D. Anode exhaust may be provided from the anode exhaust cooler 140 to mixer 210 by anode exhaust conduit 308E. Accordingly, the splitter 150 may control an amount of anode exhaust is recycled to the mixer (i.e., may control an anode exhaust recycling percentage). The anode recycle blower 212 may be configured to move anode exhaust though anode exhaust conduit 308E.

Cathode exhaust generated in the stack 102 flows to the ATO 130 through exhaust conduit 304A. Cathode exhaust and/or ATO exhaust generated in the ATO 130 flows from the ATO 130 to the cathode recuperator 120 through exhaust conduit 304B. ATO exhaust flows from the cathode recuperator 120 to the steam generator 160 through exhaust conduit 304C. Exhaust flows from the steam generator 160 and out of the hot box 101 through exhaust conduit 304D.

Water flows from a water source 206, such as a water tank or a water pipe, to the steam generator 160 through water conduit 306A. The steam generator 160 converts the water into steam using the exhaust provided by exhaust conduit 304C. Steam is provided from the steam generator 160 to the mixer 210 through water conduit 306B. Alternatively, if desired, the steam may be provided directly into the fuel inlet stream and/or the anode exhaust stream may be provided directly into the fuel inlet stream followed by humidification of the combined fuel streams. The mixer 210 is configured to mix the steam with anode exhaust and fuel. This fuel mixture may then be heated in the anode recuperator 110, before being provided to the stack 102.

The anode recuperator 110 may include various catalysts. For example, the anode recuperator 110 may include an oxidation catalyst configured to remove oxygen from the fuel, a hydrogenation catalyst configured to combine unsaturated hydrocarbons, such as ethylene and propylene (alkenes), with available hydrogen in the fuel, resulting in saturated hydrocarbons, and a reforming catalyst configured to partially reform the fuel before the fuel is delivered to the stack 102.

The system 100 may further include a system controller 225 configured to control various elements of the system 100 and a power analyzer 70. The system controller 225 may include a central processing unit configured to execute stored instructions. For example, the system controller 225 may be configured to control fuel and/or air flow through the system 100. The power analyzer 70 may be configured to detect electrical characteristics of the fuel cell stack 102.

The fuel processor 300 may be fluidly connected to a fuel source 301 by an inlet conduit 303. The system 100 may include a mass flow control valve 305 configured to control a flow rate of the fuel through the inlet conduit 303. In other embodiments, the valve 305 may be disposed on fuel conduit 300A, between the fuel processor 300 and the CPOx reactor 200. The mass flow control valve 305 may be a proportionate valve. The fuel source 301 may provide hydrocarbon fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels.

The fuel processor 300 may be configured to remove contaminants from the fuel to prevent such contaminants, such as sulfur species, from poisoning fuel cell catalysts, such as anode catalysts. For example, natural gas may be contaminated with sulfur species such as, hydrogen sulfide ($H_2S$), t-butyl mercaptan ($C_4H_{10}S$), tetrahydrothiophene ($C_4H_8S$), or the like. Accordingly, the fuel processor 300 may be a desulfurizer that includes one or more sorbent beds configured to sequester such sulfur species. Herein, sulfur species may be addressed as specific contaminants, since sulfur poisoning is a primary source of fuel cell degradation. However, the present disclosure is not limited thereto.

In cases where a breakthrough event occurs, such as when a sorbent bed is exhausted and allows contaminants to pass there through, sulfur species may reach the stack 102 and may be adsorbed onto (e.g., poison) anodes of the fuel cells. In particular, it is believed that the sulfur species are adsorbed onto the nickel of the anodes and restrict fuel cell reactions by limiting reformation and proton generation. As a result, the performance of a fuel cell system may be reduced by such adsorption.

Once a breakthrough event is detected, a reserve capacity sorbent bed may be used to prevent more undesirable constituent from reaching the fuel cell stack (i.e., power generation module). Specifically, the system controller 225 may change the operation of the fuel cell system 100 by altering fuel flow, such as by utilizing a reserve sorbent bed in the fuel processor, powering portions of the fuel cell system on/off, selecting different fuel sources, etc.

Sulfur Poisoning Detection and Prevention

After a breakthrough event, sulfur poisoning of an anode may occur in two stages. In the first stage, a fuel cell may exhibit a slow and steady voltage drop as sulfur species are adsorbed onto the anode thereof. If sulfur species exposure continues over a prolonged period, the fuel cell may enter the second stage, wherein a cell voltage of the fuel cell flicker (e.g., exhibit periodic voltage reductions). The first stage may be reversible if sulfur species are removed from the anode before a cell enters the second stage. However, the second stage may result in irreversible damage to the fuel cell. Accordingly, the present disclosure provides system and methods of detecting sulfur poisoning and protecting fuel cells from permanent sulfur damage.

FIG. 3 is a plan view showing electrical connections and sulfur detection components that may be included in the system 100 of FIG. 2, according to various embodiments of the present disclosure.

Referring to FIGS. 2 and 3, the stack 102 includes the power generating fuel cells 10 of FIG. 1 stacked on one another and separated by interconnects 50. The interconnects 50 include flow channels (not shown) configured to provide fuel or air to the power generating fuel cells 10. The interconnects 50 may also operate to electrically connect the power generating fuel cells 10 in series. Accordingly, an uppermost and a lowermost interconnect 50 may operate as conductive end plates that include positive and negative electrical terminals for the stack 102 connected to electrical leads 74 (which in this case comprise stack leads), or are electrically connected to other stacks(s) in the same column of fuel cell stacks (in which case the electrical leads 74 comprise fuel cell column leads). Positive and negative terminals of the stack 102 may be electrically connected to one or more DC/DC converters 80 by electrical leads 74. The DC/DC converter(s) 80 may be configured to output DC voltages to a DC bus 75 including positive, negative, and neutral lines. The DC bus 75 may be electrically connected to multiple stacks 102, and may form a main power generating bus of the system 100. The stack 102 may also include dielectric end plates 60 disposed on opposing ends thereof and which may be formed of a ceramic material.

The sulfur detection elements may include the power analyzer 70 and one or more sensing fuel cells. For example, the system 100 may include at least one first sensing fuel cell 11A, which may be disposed between two interconnects on an end of the stack 102. The first sensing fuel cell 11A may be electrically isolated from the power generating fuel cells 10 by a corresponding dielectric end plate 60. In other words, the first sensing fuel cell 11A and its adjacent interconnects 50A may not be electrically connected to the DC/DC converter(s) 80 and the main power generating bus 75. However, the first sensing fuel cell 11A may receive the same air and fuel as provided to the power generating fuel cells 10 of the stack 102 that are electrically connected to the DC/DC converter(s) 80 and DC bus 75.

The first sensing fuel cell 11A may be electrically connected to an auxiliary load 90 through separate sensing cell leads 77 different from the electrical leads 74. The sensing cell leads 77 are connected to interconnects 50A that contact the anode and cathode of the first sensing fuel cell 11A. For example, the auxiliary load 90 may be a battery or may be an electrically operated component of the fuel cell system 100, such as a blower, an indicator, or an electromagnetic valve. Accordingly, power generated by the first sensing fuel cell 11A may be utilized to operate elements of the system 100. In the alternative, the auxiliary load 90 may be a dummy load, such as an electrical resistor.

In other embodiments, the system 100 may alternatively or additionally include at least one second sensing fuel cell 11B, which may be disposed within the stack 102. For example, the second sensing fuel cell 11B may be disposed between adjacent power generating fuel cells 10. The second sensing fuel cell 11B may be electrically connected in series with the power generating fuel cells 10 of the stack 102. Accordingly, the second sensing fuel cell 11B may receive the same air and fuel as provided to the power generating fuel cells 10 of the stack 102, or outside of the stack 102 at another location in the same hotbox.

While one first sensing fuel cell 11A and one second sensing fuel cell 11B are shown in FIG. 3, the present disclosure is not limited thereto. For example, the system 100 may include multiple first sensing fuel cells 11A, which may be electrically connected in series, and/or may include multiple second sensing fuel cells 11B, which may be electrically connected to one another in series. Further, the system 100 may include additional sensing fuel cells at other locations in and/or on the stack 102 and/or located outside the stack 102 in the same hot box as the stack 102.

The power analyzer 70 may be configured to detect changes in a voltage and/or current of the sensing fuel cell(s) 11A, 11B, and may be wired or wirelessly connected to the system controller 225. For example, the power analyzer 70 may be electrically connected to interconnects 50A, 50B disposed on opposing sides of the respective sensing fuel cell(s) 11A, 11B, by cell leads 72. In some embodiments, the power analyzer 70 may also be electrically connected to the electrical leads 74.

The system controller 225 may be configured to indirectly detect sulfur species in the fuel provided to the stack 102, based on voltage and/or current measurements output from the power analyzer 70. For example, the system controller 225 may be configured to detect a voltage drop and/or voltage flickering that corresponds with sulfur poisoning of a sensing fuel cell 11A, 11B, by analyzing voltage data provided by the power analyzer 70.

Referring to FIGS. 1 and 3, the sensing fuel cells 11A, 11B may be fuel cells similar to the power generating fuel cells 10, except that the sensing fuel cells 11A, 11B are configured to allow for more rapid detection of sulfur poisoning. In particular, while not wishing to be bound to a particular theory, the present inventors have determined that the effect of sulfur poisoning on a fuel cell is proportional to the thickness of the fuel cell anode, with relatively thin anodes experiencing the effects of sulfur poisoning more rapidly than relatively thick anodes. Accordingly, the sensing fuel cells 11A, 11B may include anodes 40 that are thinner than the anodes 40 of the power generating fuel cells 10. For example, the sensing fuel cells 11A, 11B may include anodes 40 having a thickness that is from about 80% to about 20%, such as from about 70% to about 30%, or about 50% of the thickness of the anodes 40 of the power generating fuel cells 10.

In some embodiments, the second layer 44 of the anode 40 of the sensing fuel cells 11A, 11B may be thinner than the second layer 44 of the power generating fuel cells 10, and the first layers 42 of the power generating fuel cells 10 and sensing fuel cells 11A, 11B may have substantially the same thickness. For example, the sensing fuel cells 11A, 11B may include a second layer 44 having a thickness that is from about 80% to about 20%, such as from about 70% to about 30%, or about 50% of the thickness of the second layer 44 of the power generating fuel cells 10.

Referring again to FIGS. 2 and 3, various embodiments of the present disclosure provide a sulfur detection method. In particular, in the event of a sulfur species breach, sulfur species may be adsorbed onto anodes of the power generating fuel cells 10 and the sensing fuel cells 11A, 11B. Since the anodes of the sensing fuel cells 11A, 11B are thinner than the anodes of the power generating fuel cells 10, poisoning of the sensing fuel cells 11A, 11B proceeds more rapidly than poisoning of the power generating fuel cells 10.

Accordingly, the sensing fuel cells 11A, 11B may exhibit a voltage drop associated with the first stage of sulfur poisoning, while the power generating fuel cells 10 continue to operate normally. Further, the sensing fuel cell(s) 11A, 11B may exhibit voltage flickering associated with the second stage of sulfur poisoning, while the power generating fuel cells 10 continue to operate normally or at a reduced voltage consistent with the first stage of sulfur poisoning. Accordingly, the sensing fuel cells 11A, 11B may protect the power generating fuel cells 10 by serving as an early warning system. When the voltage drop or flickering in the sensing fuel cell(s) 11A, 11B is detected by the power analyzer 70, the system controller 225 may perform one or more corresponding functions. Alternatively, instead of or in addition to detecting sulfur poisoning of the sensing fuel cells 11A, 11B by measuring a voltage drop or flickering of the sensing fuel cells 11A, 11B, electrochemical impedance spectroscopy (EIS) can be used to detect sulfur poisoning of the sensing fuel cells 11A, 11B. For example, as discussed below, a change in the output EIS signal from the sensing fuel cells 11A, 11B can indicate sulfur poisoning.

The system controller 225 may generate a system alarm indicating that a sulfur breach has occurred and/or replacement sorbent beds are needed. The system controller 225 may also control the fuel processor 300 to switch from an exhausted sorbent bed to a fresh sorbent bed. In the event that no fresh sorbent beds are available, the system controller 225 may generate a system alarm indicating that replacement sorbent beds are needed and/or may shut down the fuel cell system 100 to prevent further sulfur poisoning.

Once the fuel processor 300 is operating normally, the system controller 225 may control one or more of the stacks 102 to enter a recovery protocol. Conventionally, once a new sorbent bed has been activated, a fuel cell system is operated with substantially sulfur-free fuel, and fuel cell performance may slowly improve. In particular, during operation, sulfur species may be slowly desorbed from the anodes over the course of a number of days of operation. However, during this period, the fuel cell system will run at a lower efficiency. In particular, fuel may pass through the fuel cells without being reacted, due to the poisoning of the anodes by the sulfur species.

Accordingly, the present disclosure provides a system and method for recovering fuel cell system performance in a shorter period of time, after sulfur poisoning occurs. In particular, the present inventors have discovered that intentionally varying a current load applied to fuel cells at a high frequency rapidly improves fuel cell performance, by increasing the desorption rate of sulfur species from nickel anodes.

While not wishing to be bound by any particular theory, it is believed that during peak current of the pulse, the oxide ions at the three phase boundary of the anode may not have enough of the fuel (e.g., protons) to produce water or nickel oxide, which may lead to reaction of oxide ions transported through the electrolyte with adsorbed sulfur species, thereby rapidly generating $SO_2$ gas which is removed from the anode. In the alternative, it is believed that the pulsing may result in reaching the electrochemical oxidation potential of sulfur, which may accelerate the performance recovery through faster desorption.

For example, the controller may be configured to apply a pulsed load waveform to the stack 102 and/or to the sensing fuel cell(s) 11A, 11B. In particular, the system controller 225 may be configured to apply a pulse waveform to the stack 102, by rapidly pulsing the current load applied to the stack 102 and/or sensing fuel cell(s) 11A, 11B. The pulse waveform may have a particular frequency, peak current (e.g., pulse amplitude), and duty cycle, such that sulfur species are desorbed from cell anodes.

The peaks of each pulse waveform may have different shapes. For example, waveforms may include rectangular pulses, sinusoidal pulses, or triangular pulses. However, other suitable waveforms may be used.

In some embodiments, the waveforms may be configured to maintain a consistent system power output as well as desorb contaminants. In particular, the waveforms may include positive and negative current pulses. For example, a waveform may include sequential positive and negative current pulses. During the negative current pulses, the DC current is reduced from the base current to a trough current. In various embodiments, the negative and positive current pulses may have the same absolute magnitude, with respect to the base current. The negative current pulses may be included to maintain a consistent system power output by counteracting positive pulses of other applied waveforms applied to different stacks 102 or power modules.

The absolute magnitude of the current pulses may be from about 25% to about 200% greater than a corresponding base current, such as from about 50% to about 150%, or about 75% to about 100% greater than a corresponding base current.

In some embodiments, the base current may be the base current load of a SOFC stack and may range from about 25 amps (A) to about 50 A, such as from about 30 A to 40 A, or about 35 A. The absolute magnitude of a current pulse, as measured from a corresponding base current a SOFC stack, may range from about 10 A to about 100 A, such as from about 12 A to about 80 A, from about 14 A to about 75 A, from about 16 A to about 70 A, or from about 18 A to about 60 A. However, the absolute magnitude of a pulse may be determined according to the particular species to be desorbed and/or the electrical characteristics of a particular stack.

A pulse duty cycle of a pulse waveform may range from about 25% to about 75%, such as from about 30% to about 70%, from about 35% to about 65%, from about 40% to about 60%, from about 45% to about 55%, or about 50%. A pulse frequency of a pulse waveform may range from about 50 Hertz (Hz) to about 2 mega Hertz (MHz), such as from about 75 Hz to about 1.5 MHz, or from about 100 Hz to about 1 MHz, for example.

A period over which the pulse waveform may vary according to the amplitude of the waveform pulses. For example, a higher amplitude pulse waveform may be applied for a shorter period, as compared to a lower amplitude pulse waveform. In some embodiments, a pulsed waveform may be applied for a period ranging from a number of seconds to about an hour, such as from about 10 seconds to about 1 hour, from about 15 seconds to about 30 minutes, from about 20 seconds to about 15 minutes, about 30 seconds to about 5 minutes, or from about 1 minute to about 2 minutes.

The system controller 225 may be configured to selectively apply the pulsed load, such that total power output of the system 100 remains constant. For example, the pulse waveform may be applied to particular stacks 102, while an inverted pulse waveform is applied to an equal number of stacks 102.

Fuel Composition Detection and Utilization Control

Fuel cell operation using bio-gas is considered more environmentally friendly than operating using conventional sources derived from fossil fuels. However, bio-gas service providers generally use multiple fuel processing steps in order to achieve a desired hydrocarbon fuel concentration in the bio-gas. For example, bio-gas may include methane ($CH_4$) or other higher hydrocarbons, at a concentration ranging from about 50% to about 75% by volume. A remainder of the fuel may primarily include $H_2O$ and $CO_2$. In addition, bio-gas fuel composition may vary between providers and/or over time from the same provider.

However, variations in fuel composition may affect fuel cell system performance and stability. For example, if system parameters are not adjusted accordingly, a reduction in the methane concentration of a fuel may result in reduced power generation, and an increase in methane concentration may result in the generation of coke within the system, due to an improper steam to carbon ratio.

The hydrocarbon content of a fuel may be determined using, for example, a gas analyzer. However, such analyzers are expensive and costly to maintain. Accordingly, there is a need for a system and method of detecting the hydrocarbon content of a fuel and controlling the operation of a fuel cell system based on the detected hydrocarbon content.

According to various embodiments of the present disclosure, provided is a fuel cell system and method of estimating the hydrocarbon content of a fuel provided to the system, based on the single pass utilization rate of the fuel by the system. In particular, the single pass fuel utilization rate may be estimated using electrochemical impedance spectroscopy ("EIS"), and the hydrocarbon content may be estimated using the single pass fuel utilization rate. As used herein, "single pass" fuel utilization rate is a fuel utilization rate based on the initial fuel flow through the stack without taking into account the recycled anode exhaust stream provided into the fuel cell stack.

EIS is used to determining the overall impedance of an electrochemical device, such as fuel cell, a fuel cell stack or a fuel cell stack column to be determined by measuring a voltage or current across the electrochemical device at varying sampling frequencies. A testing waveform selected to achieve the varying sampling frequencies, such as a waveform with oscillations of approximately 1 Hz, may be generated on a line connected to the electrochemical device, thereby injecting the test waveform into the electrochemical device. The testing waveform may be a sine wave or other type wave selected to achieve desired sampling frequencies. A voltage or current and resulting phase angle of the electrochemical device may be determined at each of the sampling frequencies, and using EIS converted into impedances. EIS provides a measurement of the polarization behavior and conductivity properties of electrodes, electrolytes and/or current carriers in electrochemical devices, such as fuel cells.

EIS provided information on the degradation pattern of the electrochemical device, health of the electrochemical device (e.g., whether repair is needed), chemical composition of the fuel provided to the electrochemical device and/or electrochemical composition (e.g., electrode composition) of deployed electrochemical device. Results of the EIS procedure (e.g., the measured impedance at varying frequencies) may be graphically represented using a Nyquist plot or Bode plot and characteristics of the electrochemical device may be determined based on the impedance response of the electrochemical device. By comparing the impedance response of the electrochemical device being measured to known signatures of impedance responses of electrochemical devices with known characteristics, the characteristics of the measured device may be identified. Characteristics of the electrochemical device that may be determined based at least in part on the impedance response include fuel conditions (e.g., fuel utilization rate), air conditions (e.g., an air utilization rate), catalyst conditions (e.g., cracks in anode electrode catalyst and/or carbon or sulfur poisoning of the anode electrode catalyst), and water conditions (e.g., PEM fuel cell membrane water flooding).

Based on the characteristics of the electrochemical device, a setting of the electrochemical device may be adjusted. For example, based on the fuel utilization rate and/or water flow rate, a fuel flow and/or water flow into the fuel inlet stream setting for fuel provided to the electrochemical device may be adjusted. Additionally, determined characteristics of the electrochemical device may be compared to a failure threshold, and when the characteristics exceed the failure threshold, a failure mode of the electrochemical device may be indicated, such as a fuel starvation state, a catalyst poisoning state, or a water flooding state.

Figure 4:
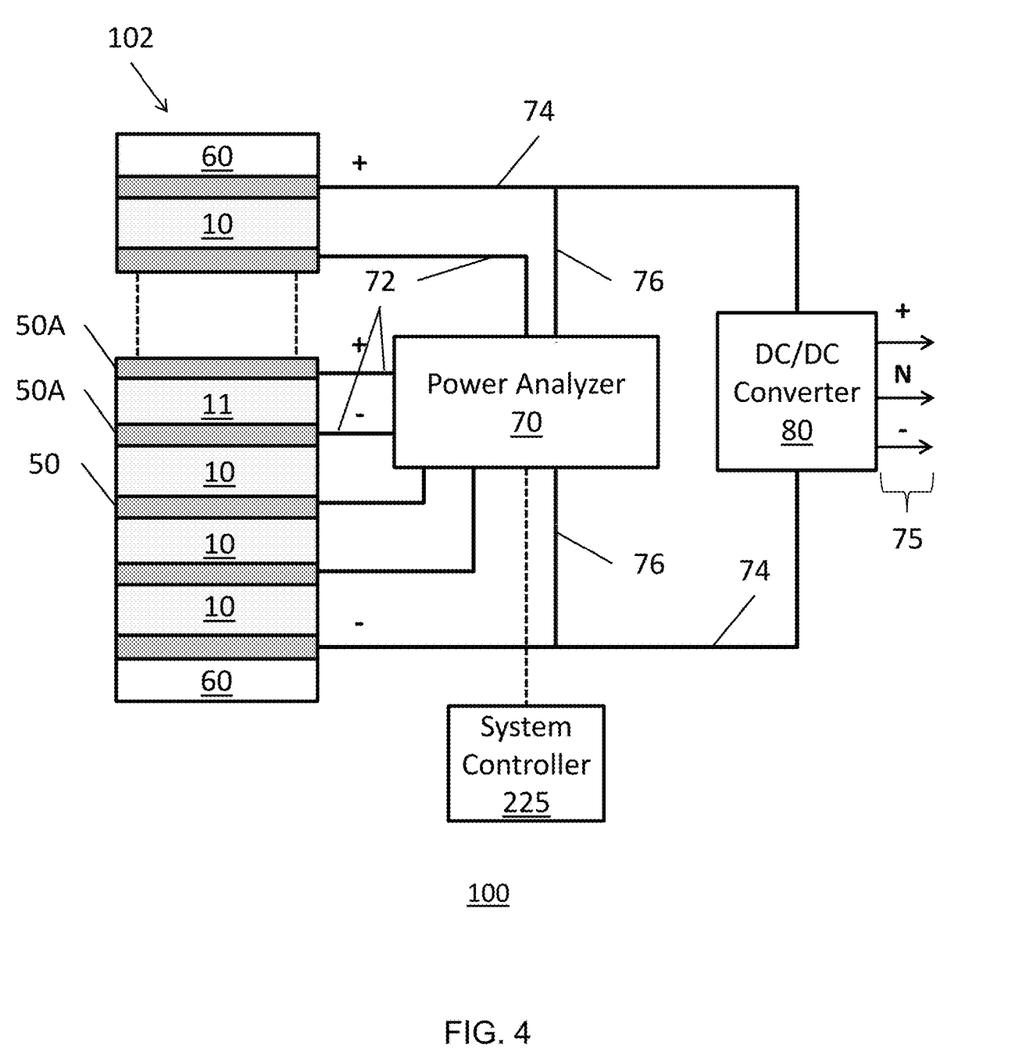
FIG. 4 is a plan view showing electrical connections and EIS components that may be included in the system 100 of FIG. 2, according to various embodiments of the present disclosure.

FIG. 4 is a plan view of electrical connections and EIS components that may be included in the system 100 of FIG. 2, according to various embodiments of the present disclosure. Referring to FIGS. 2 and 4, the power analyzer 70 may include a waveform generator and may be referred to as an EIS analyzer 70.

The power analyzer 70 may be wired or wirelessly connected to the system controller 225. The power analyzer 70 may be electrically connected to positive and negative terminals of one or more of the power generating fuel cells 10 and/or sensing fuel cells 11 of the stack 102, by cell leads 72. For example, the cell leads 72 may be electrically connected to one or more of the interconnects 50. The power analyzer 70 may also be electrically connected to positive and negative terminals of the stack 102 by analyzer leads 76 connected to the electrical leads 74. The electrical leads 74 may be connected to a DC/DC converter(s) 80 and a DC bus 75, as discussed with regard to FIG. 3.

The power analyzer 70 and/or the DC/DC converter(s) 80 may be configured to inject test waveforms into the stack via the analyzer leads 76. In operation, system controller 225 may select one or more power generating fuel cells 10 and/or sensing fuel cell(s) 11A, 11B of on which to perform EIS monitoring. The system controller 225 may control the power analyzer 70 and/or the DC/DC converter(s) 80 to inject a test waveform via the analyzer leads 76 into the fuel cell stack 102 to test the entire stack 102, to test a column of stacks 102 and/or to inject a test waveform into the cell leads 72 to test one or more fuel cells in the stack 102 that are located between the cell leads 72. The system controller 225 may control the power analyzer 70 to receive the output from each selected fuel cell 10 and/or sensing fuel cell 11. In an embodiment, the test waveform may be a full frequency sweep waveform. In another embodiment, the test waveform may be super positioned frequencies or standard ranges of frequencies to enable only particular regions of frequencies to be tested, such as 10 KHz, 8 KHz, 6 KHz, 4 KHz, 3 KHz, 2 KHz, 1 KHz, etc. The power analyzer 70 may be configured to measure the resulting current and/or voltage output of the selected cells and output the measurement results to the system controller 225. By injecting different test waveforms into the fuel cell stack 102, different impedance responses of the cells 10 and/or 11 of the fuel cell stack 102 may be monitored.

Referring to FIGS. 2 and 4, the system controller 225 may use the impedance response determined by the power analyzer 70 and/or the DC/DC converter(s) 80 to determine a characteristic of one or more cells of the stack 102. The system controller 225 may adjust a setting of the system 100 based on the determined characteristic.

For example, the system controller 225 may determine a fuel utilization rate and/or steam to carbon ratio in the fuel inlet stream of a fuel cell based on EIS monitoring, and may adjust a fuel flow setting and/or water input into the fuel inlet steam setting of the system 100, based on the determined fuel utilization rate by adjusting the recycle blower 212, fuel flow through fuel conduit 300A, and/or water flow through conduit 306A into steam generator 160. As another example, the system controller 225 may determine an air utilization rate of the selected fuel cell of the fuel cell stack 102 based on EIS monitoring and may adjust an air flow setting of the system 100 based on the determined air utilization rate by adjusting the air blower 208. As other examples, EIS monitoring may determine characteristics of a selected fuel cell of the fuel cell stack 102 to be compared to a failure threshold, and when the characteristics exceed the failure threshold a failure mode of the selected fuel cell of the fuel cell stack 102 may be indicated, such as a fuel starvation state (e.g., insufficient fuel at the anode), anode catalyst damage or poisoning state (e.g., by carbon and/or sulfur build up on the anode, anode catalyst cracking, etc.), or a water flooding state (e.g., in a PEM fuel cell) which may result in the fuel and/or water flow into the system being adjusted or may result in the shut off of the system.

Figure 5:
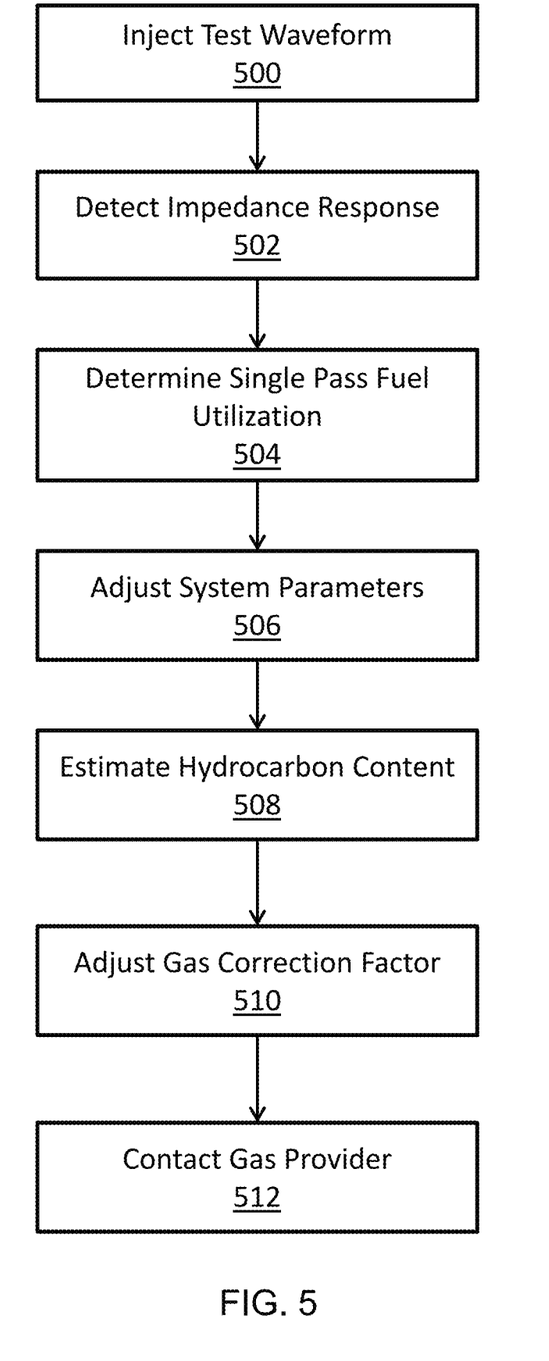
FIG. 5 is a block diagram illustrating a method of operating the system of FIG. 4.

FIG. 5 is a block diagram illustrating a method of operating a fuel cell system as shown in FIGS. 2 and 4. Referring to FIG. 5, in step 500, the method includes injecting a test waveform into a fuel cell stack. In step 502, an impedance response of one or more fuel cells of the stack resulting from the test waveform may be detected. For example, a response of the sensing cell(s) 11A, 11B may be detected and/or a response of all power generating fuel cells 10 in the stack 102 may be detected.

In step 504, single pass fuel utilization of the one or more fuel cells may be determined by using a system controller to compare the detected impedance response to impedance responses stored in a memory, such as stored plots of impedance responses and/or stored impedance values, of similar fuel cells correlated with known characteristics. Based on the comparison the single pass fuel utilization rate may be determined. Alternatively or in addition, sulfur poisoning of the anodes of the sensing cell(s) 11A, 11B may be detected.

In step 506, fuel cell system parameters may be adjusted based on the determined single pass fuel utilization. For example, the fuel flow rate of the system may be adjusted to achieve a desired fuel utilization rate, the operational current of the system may be adjusted, and/or an anode recycling percentage may be adjusted by adjusting the speed of the recycle blower 212, in order to maintain a desired steam to carbon ratio in the system.

In step 508, the hydrocarbon content of a fuel provided to the system may be estimated based on the detected single pass fuel utilization. In particular, the system controller may be configured to reverse calculate the hydrocarbon content of the fuel based on the EIS measurements, since $H_2$ and CO are generated using the fuel supplied to the fuel cell system and are used to generate power.

In step 510, the fuel cell gas correction factor may be adjusted based on the estimated fuel hydrocarbon content. In particular, the gas correction factor may be adjusted in order to provide an appropriate amount of fuel flow for a desired current and fuel utilization rate. The fuel flow may be controlled using the mass flow control valve included in the system. In other embodiments, system air flow, steam generation, and/or anode recycle percentage may be adjusted as described above.

Optionally, in step 512 the method may include contacting a fuel provider if the fuel composition is outside a set range. For example, if the hydrocarbon content of the fuel dropped below, for example, about 50% by volume, the fuel provider may be alerted.

Optionally, if the sulfur poisoning of the sensing cell(s) anode(s) is detected, then the sorption bed can be replaced and/or the fuel inlet stream is rerouted to a different sorption bed in the desulfurizer.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A fuel cell system comprising:
   power generating fuel cells disposed in a stack, each power generating fuel cell comprising an anode, a cathode, and an electrolyte;
   a sensing fuel cell comprising an anode, a cathode, and an electrolyte; and
   a fuel processor configured to purify a fuel provided to the power generating fuel cells and the sensing fuel cell,
   wherein the anode of the sensing fuel cell is thinner than the anodes of the power generating fuel cells.

2. The system of claim 1, wherein the anode of the sensing fuel cell is from about 80% to about 20% thinner than the anodes of the power generating fuel cells.

3. The system of claim 1, further comprising:
   a power analyzer configured to detect a voltage of the sensing fuel cell; and
   a system controller configured to detect poisoning of the sensing fuel cell, based on the voltage detected by the power analyzer.

4. The system of claim 1, wherein:
   the anodes of the power generating fuel cells and sensing fuel cell comprise a first layer disposed on the electrolyte and configured to increase electron conduction and a second layer disposed on the first layer and configured to operate as a reforming catalyst; and
   the second layer of the sensing fuel cell is from about 80% to about 20% thinner than the second layers of the power generating fuel cells.

5. The system of claim 1, wherein the system comprises a plurality of the sensing fuel cells electrically connected to one another in series.

6. The system of claim 1, wherein the sensing fuel cell is disposed within the stack and is electrically connected to the power generating fuel cells in series.

7. The system of claim 1, wherein:
   the sensing fuel cell is separated from the fuel cells by a dielectric end plate of the stack; or
   the sensing fuel cell is located outside of the stack in a hotbox in which the stack is disposed.

8. The system of claim 7, wherein:
   the power generating fuel cells are electrically connected to a primary power generating bus of the system; and
   the sensing fuel cell is electrically connected to an auxiliary load.

9. The system of claim 8, wherein the auxiliary load is a battery or an electrically operated component of the fuel cell system.

10. The system of claim 7, further comprising:
    a power analyzer configured to detect a voltage of the sensing fuel cell; and
    an additional sensing fuel cell disposed within the stack and electrically connected to the power generating fuel cells and the power analyzer.

11. The system of claim 3, wherein:
    the system controller is configured to detect poisoning of the sensing fuel cell based on a voltage drop or a flickering of the voltage of the sensing fuel cell detected by the power analyzer; and
    the fuel processor comprises a desulfurizer.

12. The system of claim 11, wherein the flickering of the voltage results from the adsorption of sulfur species onto the anode of the sensing fuel cell.

13. The system of claim 3, wherein the system controller is configured to detect poisoning of the sensing fuel cell based on an electrochemical impedance spectroscopy (EIS) response of the sensing fuel cell.

14. The system of claim 3, wherein the system processor is configured to operate the system in a recovery mode to desorb contaminants from the power generating fuel cells, after the system processor detects the poisoning of the sensing fuel cell.

15. The system of claim 3, wherein after the system processor detects the poisoning of the sensing fuel cell, the system processor is configured to:
    control the fuel processor, such that the fuel processor switches between an exhausted adsorption bed to a fresh adsorption bed; or
    generate an alarm signal if no fresh adsorption bed is available in the fuel processor.

16. A fuel cell system comprising:
    fuel cells disposed in a stack;
    a power analyzer containing a waveform generator configured to inject a testing waveform into the stack and to measure a resulting impedance response in at least one of the fuel cells; and
    a system controller configured to estimate the hydrocarbon content of a fuel provided to the stack, based on the measured impedance response.

17. The system of claim 16, wherein the system controller is configured to:
- determine a single pass fuel utilization rate of the at least one fuel cell, based on the measured impedance response; and
- estimate the hydrocarbon content of a fuel provided to the stack, based on the determined single pass fuel utilization.

18. The system of claim 16, wherein the system controller is configured to adjust a flow rate of fuel to the stack, an operational current of the stack, an anode recycling percentage, or a combination thereof based on the estimated hydrocarbon content of the fuel.

19. The system of claim 16, wherein the system controller is configured to generate an alarm, when the estimated hydrocarbon content of the fuel is less than a set percentage.

* * * * *